May 29, 1956 L. J. KMIECIK 2,747,802
PRESSURE AND TEMPERATURE RELIEF VALVES
Filed Feb. 8, 1952
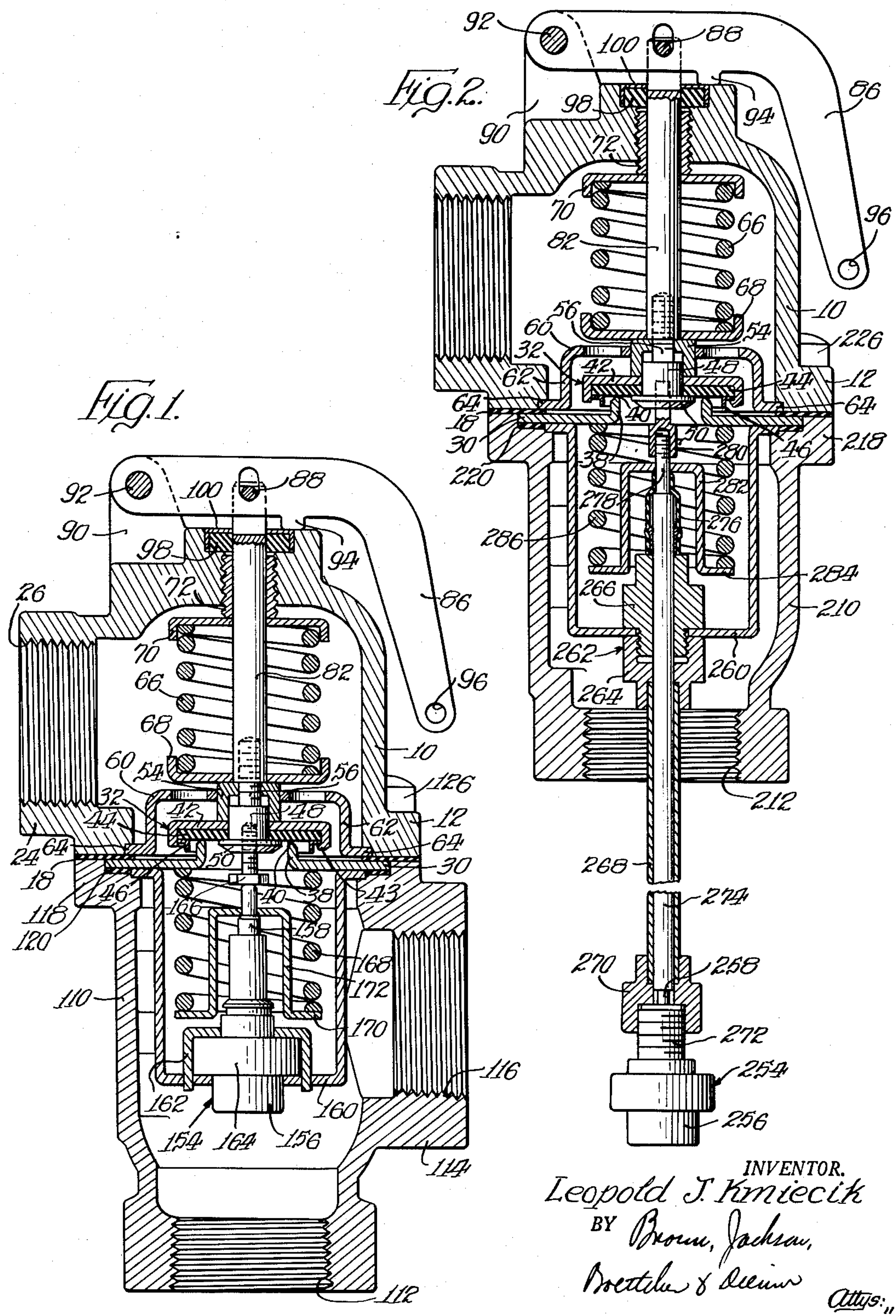
INVENTOR.
Leopold J. Kmiecik
BY Brown, Jackson, Boettcher & Dienner
Attys.

United States Patent Office 2,747,802

Patented May 29, 1956

2,747,802

PRESSURE AND TEMPERATURE RELIEF VALVES

Leopold J. Kmiecik, Chicago, Ill., assignor to McDonnell & Miller, Inc., Chicago, Ill., a corporation of Delaware Application February 8, 1952, Serial No. 270,699

6 Claims. (Cl. 236—92)

The present invention relates to fluid medium control valves and particularly to valves responsive to the pressure and temperature of the medium to be controlled.

In my copending application, Serial No. 254,080, filed October 31, 1951, now Patent No. 2,695,032, I have disclosed a valve responsive to the pressure of the fluid in the system with which the valve is associated for relieving or venting pressures in the system in excess of a predetermined maximum. In my copending application, Serial No. 262,061, filed December 17, 1951, now Patent No. 2,668,663, I have disclosed a valve responsive to the temperature of the fluid in the system with which the valve is associated for relieving or venting the system of fluid having a temperature in excess of a predetermined maximum.

An object of the present invention is to provide improved valves comprising a combination of the two valves of my prior applications.

Another object of the present invention is to provide valves sensitive or responsive both to the temperature and pressure of the medium to be controlled by the valve, and wherein the pressure responsive means is insensitive to temperature and the temperature responsive means is insensitive to pressure.

A further object of the invention is the provision of improved temperature and pressure responsive valves including a temperature responsive unit adapted to be disposed directly in the path of fluid flow of the medium to be controlled and wherein the valve to be actuated by said unit may be located remotely from said unit.

A still further object of the present invention is the provision of improved temperature and pressure responsive valves providing the advantages of the individual valves disclosed in my identified copending applications, wherein the valve is actuated directly in accordance with the control function of either pressure or temperature and not in accordance with a combination thereof.

An additional object of the invention is the provision of improved temperature and pressure responsive valves of improved construction and operation and of economical manufacture and assembly.

Other objects and advantages of the present invention will become apparent in the following detailed description of preferred embodiments of the invention, wherein reference is made to the accompanying drawings, in which:

Figure 1 is a vertical cross-section of one embodiment of the temperature and pressure responsive valve of the present invention; and Figure 2 is a vertical cross-section of a second embodiment of the present invention, wherein the temperature responsive unit is disposed remotely from the valve.

Referring now to the drawings, it will be noted that in both embodiments of the invention, the valve comprises a pressure portion and a temperature portion, which in the normal disposition of the valves, as shown, are the upper and lower halves or portions, respectively. The pressure portions of the two embodiments of the present invention are identical and comprise, generally, a substantially tubular body member 10 having at its lower end an outwardly extending radial flange or base portion 12 and having, intermediate its ends, an outwardly extending radial boss 24 within which a threaded bore 26 is formed, the bore constituting a fluid outlet for the body of the valve. The threaded bore 26 is adapted for the reception of an outlet pipe or conduit which may suitably lead to a point of drainage or the like. The tubular body 10 is open at its lower surface and, for the time being, the opening at the bottom of the valve may conveniently be referred to as the inlet to the pressure portion of the valve.

Valve means in the form of a generally annular valve seat member 30 and a cup-shaped valve member 32 are disposed adjacent the inlet to the pressure portion of the valve and are adapted to control flow through the body 10 between the inlet and the outlet 26. The annular valve seat member 30 is positioned at the lower end of the body 10 and extends outwardly beyond the limits of the bore through the body 10 so that the peripheral margin thereof is adapted to engage the lower surface of the flange 12 of the body 10. The valve seat member 30 may be suitably sealed with respect to the flange 12 by means of an annular gasket 18 disposed between the valve seat member and the lower surface of the body member. At its central portion, the valve seat member 30 is provided with an axially extending tubular portion 38 of reduced diameter, with respect to the bore of the body 10, which at its upper end presents an annular edge 40 comprising a valve seat. The edge 40 is preferably rounded to provide a smooth valve seat. The exterior or peripheral portion of the reduced tubular extension 38 of the valve seat member adjacent the valve seat 40 is tapered toward the valve seat, the taper being disposed preferably at an inclination of approximately 45° to the wall of the extension 38. The purpose of the tapered portion of the valve seat member will be explained in detail hereinafter.

The valve member 32 comprises an inverted cup-shaped metallic member 42 adapted for the reception of an annular sealing disc 44 and an annular angle member 46. The annular angle member 46 is adapted to be secured within the cup-shaped metallic member 42 in any customary manner, such, for example, as by peening over portions of the cup, as at 43, after the angle member is inserted in the cup. The angle member serves to secure the peripheral portions of the sealing disc 44 in the cup-shaped member 42. The annular angle member 46 includes a radial flange portion and a depending flange portion coaxial or concentric with and adapted to encircle the reduced extension 38 of the valve seat member adjacent the valve seat 40, the depending flange being spaced radially from the peripheral margin of the extension 38 so as to provide a huddling chamber action, as will be explained in detail hereinafter. The disc 44 is adapted for cooperation with the valve seat 40 to sealingly close the valve, the rounded edges of the valve seat preventing cutting and rapid deterioration of the seal 44.

The cup-shaped member 42 and the annular seal 44 are provided with central apertures adapted for the reception of a first cylindrical stem member 48 which is provided with a head 50 engaging and sealing against the lower surface of the seal 44. The first stem member 48 is slidably received in a second tubular stem member 54 and is provided with a threaded reduced extension or end portion 56 which suitably may be secured to the second stem member 54. The stem members 48 and 54 comprise a stem for the valve 32. The stem of the valve is guided for reciprocal sliding movement within a bore in an inverted U-shaped guide strap 60. The guide strap 60 includes depending legs 62 having an outwardly extending flange 64 at the lower end of each leg. The flanges 64 of the strap 60 are adapted to be confined between the flange 12 of the body portion 10 and the valve seat member 30 to secure the strap in position to guide the valve member for movement toward and away from the valve seat. The body 10 is preferably provided with a pair of diametrically opposed recesses adapted for the reception of the outwardly extending flanges at the lower ends of the legs 62 of the strap 60. If desired, however, an annular recess may be formed in the body member 10 for the reception of the flanges 64. The flanges of the strap are suitably confined between the body member 10 and the gasket 18 which rests upon the valve seat member 30. The U-shaped strap 60 may be pierced at various places to reduce resistance to flow through the valve.

The valve 32 is normally held to its seat by means of a spring 66, which is preferably a helically coiled spring. The spring 66 is suitably confined between and retained by a pair of oppositely disposed cup-shaped retainers 68 and 70. The retainer 68 is provided with a central aperture adapted for the reception of the reduced end portion of the valve stem member 48 and rests on the upper surface of the stem member 54. The retainer 70 engages and is held against movement by a calibrating screw 72 operatively associated with the body 10. The valve 32 is controlled by the spring 66 and is adapted to be automatically opened upon occurrence of fluid pressures within the valve in excess of the calibrated force of the spring 66.

It is preferable to provide manual means for opening the valve to vent the fluid pressure tank or system with which the valve is associated to atmosphere or to a suitable point of drainage. To this end, the retainers 68 and 70, the calibrating screw 72 and the upper portion of the body member 10 are provided wth axial bores adapted for the slidable passage therethrough of a rod or stem member 82. The stem 82 is provided at its lower end with a threaded axial bore adapted for the threaded reception of the threaded end portion 56 of the valve stem member 48 to positively connect the stem 82 to the valve member 32 whereby the stem is adapted for manual actuation of the valve member. While a positive connection between the stem or rod 82 and the valve member 32 has been shown herein as being preferable, it will be appreciated that a lost motion connection between the stem 82 and the valve member 32, such as disclosed in my copending application, Serial No. 254,080, may suitably be incorporated in the valve without departing from the scope of the present invention.

To provide means for effecting manual actuation of the rod 82, the upper end of the rod is bifurcated for the reception of a generally L-shaped lever 86 pivotally connected to the rod 82 by means of a transverse pin 88. The pivotal connection between the rod 82 and the lever 86 may be accomplished in any customary manner, such, for example, as by means of pin 88 passing through the bifurcated portions of the rod 82 and through a suitable aperture provided in the lever 86. The aperture in the lever 86 preferably comprises a slotted or elongated aperture to provide a lost motion connection adapted to accommodate relative movement between the rod 82 and the actuating lever 86, so that automatic actuation of the valve 32 will not result in movement of the lever 86. The lever 86 is pivotally connected at one end to the body 10 and to provide means for effecting the pivotal connection of the body and the lever, the body 10 is preferably provided with an upstanding bifurcated extension 90 adapted for the reception of one end of the lever 86, the pivotal connection being accomplished by means of a pin 92 extending through suitable apertures in the bifurcated portions 90 of the body and through a suitable aperture adjacent one end of the lever 86. The lever 86 is preferably provided with an integral stop portion 94 adapted for engagement with the top surface of the body 10 to limit downward movement of the lever. At the end opposite the pivotal connection of the lever 86 to the body 10, the lever is provided with an aperture 96 adapted for the reception of a cord or the like so that the valve may be manually actuated at a considerable distance from the valve.

To seal the rod 82 with respect to the body 10, the body 10 is counterbored coaxially of the bore accommodating passage of the rod 82 to provide a recessed portion adapted for the reception of an annular seal 98 engaging the peripherial surface of the rod 82 and engaging the body to provide a seal therebetween. The seal 98 is suitably backed and retained within the body 10 by means of a metallic cup-shaped member 100 which suitably may be press fit into the counterbore of the body 10.

The bore in the body 10, accommodating passage of the rod or stem 82, is threaded for the adjustable reception of the calibration screw 72. The screw 72 is provided at its upper end with a kerf so that the screw may be engaged by a suitable tool to adjust the position of the screw 72 in the threaded bore so as to vary the degree of compression of the spring 66 to calibrate the valve.

In operation, as fluid pressure at the valve inlet reaches a certain magnitude, determined by the compressive force exertion of the spring 66, the valve 32 will be automatically opened. In other words, as the fluid pressure at the inlet acting upon the exposed area of the valve 32 is sufficient to overcome the spring 66, the valve 32 will be opened to vent the presure system or tank with which the valve is associated, or to establish communication between the valve inlet and the valve outlet 26. In early pressure relief valves, the valve was designed so that the area of the valve exposed to fluid pressures within the pressure system was the same after opening as before. Since the area exposed to the fluid pressure was the same after opening as before, the valve would normally open to only a very slight extent and would readily return to its seat so that actuation of the valve was frequent and rapid. Due to the narrow opening of the valve, escaping fluids would pass over the surface of the valve at such velocity as to create a problem commonly referred to as wire drawing. Furthermore, the valve in its rapid actuation from and immediately back to its seat created a chatter, rapid deterioration of the valve and inefficient relief of the pressure system with which associated. To overcome these disadvantages, several later pressure relief valves provided a valve member which would have a greater area exposed to the fluid pressure within the system immediately after opening then while closed, so that the pressure in the system acting upon the greater exposed area of the valve would rapidly move the valve to fully open position in which adequate and substantially complete pressure relief of the system would be effected. These valves constituted a substantial improvement in the art, since the wide opening in the valve provided substantial pressure relief, lessened the frequency of actuation of the valve, reduced chattering and, due to the large opening of the valve, reduced the occurrence of wire drawing. However, these latter valves were not entirely satisfactory, since the effective opening of the valve to its full extent was not always accomplished in the desired or theoretical manner, which led to substantially all of the disadvantages that had been suffered with earlier pressure relief valves.

To overcome the disadvantages of prior devices and to insure automatic actuation of the valve to a fully open position, I provide a valve having a surface area exposed to fluid pressure greater after opening than before and, in addition, provide means for accomplishing a huddling chamber effect to insure exertion of force on the greater exposed area of the valve member so that same is moved to its full open position at each actuation. To provide this huddling chamber effect, the annular angle member 46 has a depending flange portion encircling and spaced radially from the reduced tubular portion 38 of the valve seat member 30. The depending flange of the angle member 46 extends to a substantial extent below the valve seat 40 of the member 30 so that fluids escaping from the valve seat member after initial opening of the valve will necessarily exert pressure upon the increased exposed area of the valve member before passage to the outlet pipe of the valve. In other words, the depending flange of the angle member, together with the reduced tubular extension 38 of the valve seat member 30, defines a restricted path of fluid flow so that fluid passing through the valve seat member will be confined or substantially confined within the area of the increased portion of the valve until the valve has been moved to a sufficient extent to raise the depending flange of the angle member 46 to or above the tapered portion of the valve seat member. The tapered portion of the valve seat member acts to increase the area or size of the path of fluid flow as the valve member moves away from its seat and thus facilitates the rapid escape of fluid after the valve is fully open so that the presure system with which the valve is associated may be completely and quickly vented. To restate the function of the depending flange portion of the angle member 46, the depending flange portion in cooperation with the reduced tubular portion 38 of the valve seat member 30 provides a restricted area of fluid escape after the valve has been slightly open, so that the fluid must exert pressure on the increased area of the valve member to rapidly and effectively move the valve member to a fully open position, at which time the depending flange portion of the angle member 46 will be raised clear of the tubular portion 38 of the valve seat member so that the fluid may escape to the outlet 26 past the tapered portion of the valve seat member.

From the foregoing, it will be appreciated that the pressure portion of the valves of the present invention insures positive actuation of the valve means in response to a predetermined pressure within the system with which the valve is associated according to the calibration of the spring 66. For further details with regard to the pressure portion of the valve of the present invention, reference is made to my said copending application, Serial No. 254,080.

Referring now to the lower portions or temperature responsive portions of the valves of the present invention, it will be apparent that the embodiment of the invention shown in Figure 1 differs from the embodiment of the invention shown in Figure 2. In Figure 1, the temperature responsive portion of the valve of the present invention includes a cylindrical body 110 provided at its lower end with a threaded aperture 112 constituting the inlet to the valve and adapted for the reception of an inlet pipe or conduit. The inlet pipe or conduit may lead from the hot water tank or may comprise a portion of a fluid system, the temperature of which fluid is to be controlled by the device of the present invention. The body portion 110 is provided substantially intermediate its ends with a radial boss 114 having a threaded outlet 116 therein comprising a normal and continuously open outlet for the valve. At its upper end, the cylindrical body 110 is provided with an outwardly extending flange 118 adapted for the reception of the flanged lower portion 12 of the body 10. The body portions 10 and 110 are preferably secured together at their flanged portions 12 and 118 by means of a plurality of machine screws 126 extending through the flanges of the body portions. The annular gasket 18 is preferably confined between the flange portions 12 and 118 of the body members to provide a seal therebetween. The body member 110 is preferably provided at its upper end with an annular groove adapted for the reception of the annular valve seat member 30 which may suitably be confined between the annular sealing gasket 18 and a second annular sealing gasket 120 so that the two body portions and the valve seat member are sealed with respect to one another.

The cylindrical body member 110 defines a generally L-shaped path of flow, which is the normal path of flow through the valve, namely through the inlet 112 and the outlet 116. The body member 10 provides a relief port, the outlet 26, adapted to be controlled by the valve 32, for venting the system with which the valve is associated of pressures in excess of a predetermined maximum and of fluids having a temperature in excess of a predetermined maximum.

To effect actuation of the valve member 32, the temperature responsive portion of the valve of the present invention includes a motor unit, indicated generally at 154, of the pressure insensitive-temperature responsive type. Any thermally responsive device that is insensitive to pressure may be utilized in the valve of the present invention, but a preferred device of the general character is of the type disclosed in Patent No. 2,128,274 to S. Vernet and Patent No. 2,259,846 to S. Vernet et al. The motor unit 154, of the type disclosed in the two identified patents, comprises a metallic body and includes a cylinder or cylinder portion 156 containing a charge of temperature responsive material and a plunger or piston 158 adapted to be actuated by the material upon variations in volume of the material as caused by variations of temperature. The motor unit 154 is supported within the cylindrical body member 110 in spaced relation to the valve member 32 by means of a U-shaped strap 160 which is provided at its upper end with outwardly extending tabs adapted to be confined between the body members 10 and 110. Preferably, an annular groove is provided in the body member 110 for the reception of the outwardly extending tabs of the U-shaped strap 160 so that the strap may be secured within the body member by means of the valve seat member 30. The U-shaped strap 160 is provided in its central or bight portion with a central aperture adapted for the reception of the cylinder portion 156 of the motor unit 154. To either side of the central aperture therethrough, the bight portion of the strap 160 is provided with a slot adapted for the reception of the lower ends of the legs of an inverted U-shaped strap 162. The legs of the U-shaped strap 162 may be suitably secured to the U-shaped strap 160 by peening over portions of the legs of the straps 162 extending through the bight portion of the strap 160. The bight portion of the strap 162 is provided with a central aperture adapted for the reception of a reduced portion of the motor unit 154 and is adapted to confine the body portion 164 of the motor unit 154 between the bight portions of the straps 160 and 162. Accordingly, it will be appreciated that the cylinder portion 156 of the motor unit 154 is held stationary with respect to the body member 110 so that the plunger 158 of the motor unit is adapted for actuation of the valve member 32.

The plunger portion 158 of the motor unit is preferably operatively associated with the valve member 32 by means of an adjustable member 166 extending between the valve member 32 and the upper end of the piston or plunger 158. The adjustable member 166 is preferably in the form of a headed stud or bolt adapted to be adjustably threaded into a tapped bore provided in the valve stem member 48, the head of the stud or bolt being adapted for engagement by the free upper end of the plunger 158 for actuation thereby. The plunger 158 is preferably maintained or biased to a position wherein the valve member 32 may firmly seat on the valve seat member 30 by means of a spring 168 confined between the valve seat member 30 and radially extending flanges 170 of an inverted U-shaped strap member 172 operatively associated with the motor plunger 158. The U-shaped strap member 172 is preferably provided with a central aperture in its bight portion adapted to be slipped over a reduced end portion of the plunger 158 and is adapted to engage a shoulder provided on the plunger 158 whereby the spring 168 is adapted to normally bias the plunger 158 to a position wherein the valve member 32 may seat firmly on the valve seat member 30 so that the valve member is normally maintained in a closed position by means of the spring 66.

In use, the temperature responsive portion of the valve of the present invention is disposed directly in the line of flow of the fluid medium, with the inlet 112 and the outlet 116 forming portions of the normal flow line. Accordingly, the path of fluid flow through the valve would be through the inlet 112 over the surface of the motor unit 154 and to the outlet 116. The motor unit 154 is formed preferably with a metallic casing so that the expansible material within the motor unit is responsive solely to variations in temperature of the medium flowing through the valve and is not in any way affected by the pressure of the fluid medium. Accordingly, the fluid pressure within the body portion 110 of the valve will have no direct effect upon the motor unit, which will be responsive solely to temperature variation. As to its temperature control characteristic, the valve member 32 is adapted to be opened only when the temperature of the medium within the body member 110 rises above a predetermined maximum, at which time, the plunger 158 of the motor unit 154 will be moved to such extent as to bring the upper end thereof into engagement with the head of the bolt 166 to move the bolt and the valve member 32 upwardly away from the stationary valve seat member 30. Accordingly, the valve member 32 will be moved to open position by the motor unit 154 solely in response to variation in temperature so as to vent the system with which associated of fluid medium of a temperature beyond a predetermined and desired maximum.

Substantial force in the motor unit 154 will be required to initially move the valve seat member 32 away from its seat. However, when the valve member is cracked, resistance to movement of the valve member 32 will be substantially reduced due to the increase in area of the valve member subjected to fluid flow through the valve body so that the motor unit 154 will be adapted to initially crack the valve and then to rapidly move the valve to a substantially full open position to provide for rapid and efficient venting of the system of fluid medium of a temperature above a predetermined maximum. Upon decrease of temperature of the medium to be controlled, the motor unit 154, being directly subject on all sides to flow through the valve body, will immediately sense the variation in temperature and release the valve member so that the plunger 158 may be returned to normal position by the spring 168 and the valve member 32 may be returned to its normal closed position by the spring 66.

As pointed out hereinbefore, the relief port outlet 26 may be suitably connected to pipes leading to a drain or any suitable point of disposal or the like in accordance with the requirements of the installation with which the valve of the present invention may be associated.

Referring now to Figure 2, the temperature responsive portion of the valve of the present invention is quite similar to the temperature responsive portion of the valve shown in Figure 1, with the exception that the normally open outlet is omitted and the temperature responsive motor unit is disposed a substantial distance from the valve member and valve body portions. Such construction is of extreme utility in instances wherein the relief valve is to be disposed at one end of a stand pipe or the like and wherein the normal path of fluid flow follows a course not passing through the valve body, so that the pressure insensitive-temperature responsive unit may be disposed directly in the path of normal fluid flow of the system. In Figure 2, the temperature responsive portion of the valve includes a cylindrical body 210 provided at its lower end with a threaded aperture 212 constituting the inlet to the valve and adapted for the reception of an inlet pipe or conduit comprising a stand pipe or the like included within the system with which the valve of the present invention is to be associated. At its upper end, the cylindrical body 210 is provided with an outwardly extending radial flange 218 adapted for the reception of the flanged lower portion 12 of the body 10. The body portions 10 and 210 are preferably secured together at their flanged portions 12 and 218 by means of a plurality of machine screws 226 extending through the flanges of the body portions. The annular gasket 18 is disposed between the flanged portions 12 and 218 of the body members to provide a seal therebetween. At its upper end, the body 210 is provided with an annular groove adapted for the reception of the annular valve seat member 30 which is suitably confined between the body members 10 and 210 and sealed with respect thereto by means of the gasket 18 and a second annular sealing gasket 220. As in the embodiment of the invention previously described, the port 212 comprises a fluid inlet for the valve and the outlet 26 comprises a relief port for the valve. To effect actuation of the valve member 32, the temperature responsive portion of the present embodiment of the invention includes a motor unit, indicated generally at 254, of the pressure insensitive-temperature responsive type described hereinbefore, including a cylinder portion 256 and a plunger or piston 258.

The body or cylinder portion 256 of the motor unit 254 is supported stationarily with respect to the cylindrical body member 210 in spaced relation to the valve member 32 by means of a U-shaped strap 260 which is provided at its upper end with outwardly extending tabs adapted to be confined between the body members 10 and 210. Preferably, an annular groove is provided in the body member 210 for the reception of the outwardly extending tabs of the U-shaped strap 260 so that the strap may be secured within the body member by means of the valve seat member 30. The U-shaped strap 260 is provided in its central or bight portion with a central aperture adapted for the reception of a mounting plug, indicated generally at 262, comprising a female portion 264 and a male portion 266 having a reduced threaded end extension adapted to extend through the central aperture in the bight of the strap 260 and to be threaded into a suitable threaded bore provided in the female member 264 so that the plug 262 may be fixedly secured to the bight portion of the strap 260. At its lower end, the female member 264 is provided with a tubular extension adapted for the reception of a tube 268 fixedly secured thereto and depending therefrom. At its lower end, the tube 268 carries a conector 270 provided at one end with a threaded bore adapted for the reception of a threaded end portion 272 of the body of the motor unit 254. Accordingly, it will be appreciated that the body portion of the motor unit 254 is supported stationarily with respect to the body member 210 by means of the strap 260, the plug 262, the tube 268 and the conector 270.

The plunger or piston 258 of the motor unit 254 is operatively associated with the valve member 32 by means of a rod 274 extending upwardly through the tube 268 and the plug 262 and into the body member 210. At its lower end, the rod 274 engages the upper end of the piston 258 for actuation thereby. Adjacent its upper end, the rod 274 is provided with a flexible sealing member 276 sealing the rod 274 with respect to the plug member 262. At its upper end, the rod 274 is provided with a reduced and threaded end portion 278 adapted for threaded engagement in a suitable bore provided in a valve actuator member 280. The valve actuator member 280 is threadably adjustable with respect to the rod 274 and is provided with a reduced end extension extending into and slidable within a suitable bore provided within the valve stem member 48. To bias the plunger 258 of the motor unit 254 to a normal position wherein the valve member 32 will be normally urged to its seat 40, an inverted U-shaped strap member 282 is fixedly secured to the reduced end portion 278 of the rod 274.

The U-shaped strap member 282 is provided with outwardly extending radial flange portions or tabs 284 and a suitable spring 286 is confined between the valve seat member 30 and the tabs 284 of the strap 282 to normally bias the motor piston 258, the rod 274 and the valve actuator 280 away from the valve member 32.

The operation of the temperature portion of the valve disclosed in Figure 2 is substantially identical to the operation of the temperature portion of the valve disclosed in Figure 1. In other words, the body portion of the motor unit 254 is held stationary with respect to the valve body and the plunger 258 of the motor unit is adapted for movement with respect to the body of the motor unit and the body portion of the valve to effect actuation of the valve means 32 upon occurrence of temperatures of the fluid medium to be controlled in excess of a predetermined maximum.

In the use and operation of the embodiment of the present invention shown in Figure 1, the inlet 112 is suitably connected with a flow conduit or the like of a fluid system with which the valve is to be associated. The outlet 116 is connected to a further conduit comprising a portion of the normal flow line of the fluid system with which the valve is associated so that the normal fluid flow line of the system extends, in an L-shaped path, through the valve body 110. The outlet 26 of the valve may be suitably associated with a conduit extending to a point of drainage or the like according to the requirements of the system with which the valve is associated. In operation, fluid normally flowing through the inlet 112 and 116 will pass over the surfaces of the temperature responsive pressure-insensitive motor unit 154 so that the expansible material within the cylinder 156 of the motor unit 154 will exactly sense the temperature of the fluid medium. When the temperature of the fluid medium exceeds a predetermined maximum, as determined by adjustment of the stud 166 with respect to the motor unit plunger 158 and the valve member 32, the motor unit is effective to move the valve member 32 away from its seat 40 against the urge of the springs 66 and 168. The motor unit 154 is capable of exerting substantial pressures, solely in accordance with the temperature of the fluid medium and without delay or substantial retardation in its responsive movement, to effect actuation of the valve member 32 against the urge of the springs 66 and 168. Opening movement of the valve member 32 in response to expansion of the material within the motor unit 154, after initial cracking of the valve, is assisted by the huddling chamber means associated with the valve member 32 so that the valve member, when once cracked by the motor unit 154, is rapidly moved to a fully opened position due to the assistance of the increased exposed area of the valve member 32 and the huddling chamber effect provided by the angle member 46 in cooperation with the tubular portion 38 of the valve seat member 30. While the huddling chamber effect and the greater exposed area of the valve member 32 cooperate to assist in opening the valve member 32 to a fully opened position, it will be apparent that initial opening of the valve 32 will be responsive solely to actuation of the motor unit 154, that is, solely in accordance with the temperature of the medium.

With respect to the pressure responsive characteristics of the valve, the valve member 32 presents an area continuously exposed to the fluid medium entering the inlet 112 so that the valve member 32 is adapted to sense the pressure of the fluid flowing through the valve body. When the pressure of the fluid exceeds a predetermined maximum, as determined by the calibration of the spring 66, the valve member 32 will be moved away from its seat and will be rapidly moved to a fully opened position due to the greater exposed area of the valve after opening and due to the provision of the huddling chamber means 46 and 38. Since the plunger 158 of the motor unit 154 merely engages the head of the stud 166 and is not fixedly secured to the valve member 32, actuation of the valve member 32 in response to pressure of the medium within the valve body will have no effect upon and will not be affected by the temperature responsive unit 154. Accordingly, it will be appreciated that the present invention provides a valve member operable in response to two separate and non-cooperating control functions, namely, pressure or temperature, but not a combination of the two.

With respect to the pressure characteristic thereof, the valve of the present invention is adapted for ready adjustment and calibration by means of the calibrating screw 72. With respect to the temperature responsive characteristic thereof, the valve is readily and effectively calibrated by adjustment of the stud 166 with respect to the valve member 32 and the plunger 158 of the motor unit 154.

The operation of the embodiment of the present invention shown in Figure 2, is substantially identical to the operation of the unit shown in Figure 1 with the exception that the temperature responsive motor unit 254 is not positioned within the valve body and extends exteriorly thereof a substantial distance, or any desired distance, so as to be disposed in the normal and continuous path of fluid flow through the system with which the valve is associated. Accordingly, the valve body is provided merely with the inlet 212, adapted to be associated with a conduit comprising a stand pipe or the like for the system with which the valve is associated, and a single outlet 26 adapted to be associated with a conduit leading to a suitable point of disposal or the like according to the requirements of the system with which the valve is associated. In operation, the motor unit 254 is adapted to sense the temperature of the fluid medium in the system and is adapted, upon the occurrence of a predetermined maximum temperature, to move the valve member 32 to an open position in response to actuation by the plunger 258 of the motor unit 254, the rod 274, and the adjustable member 280.

Pressure actuation of the embodiment of the invention shown in Figure 2 is identical to pressure actuation of the embodiment of the invention shown in Figure 1 since the interior of the body member 210 of the valve is constantly and fully subjected to the pressure of the fluid medium in the system with which the valve is associated. Calibration of the valve with respect to the pressure characteristic thereof is readily accomplished by adjustment of the calibrating screw 72. With respect to the temperature characteristic thereof, the valve is readily calibrated by adjustment of the member 280 with respect to the valve member 32 and the upper end of the rod 274 associated with the plunger 258 of the motor unit 254.

The embodiment of the invention shown in Figure 2 has, as pointed out, substantially the same actuation as does the embodiment of the invention shown in Figure 1. In particular, the valve member 32 of the embodiment of the invention shown in Figure 2 is separately actuated in response to either pressure or temperature, but is not actuated by a combination of the two.

Accordingly, it will be appreciated that the present invention provides temperature and pressure responsive valves adapted to effect a true control function according to either characteristic thereof, and which will not be actuated by a combination of the two actuating characteristics when neither characteristic attains the predetermined maximum for which the valve is calibrated.

From the foregoing, it will be appreciated that the present invention provides valve means that are economical of manufacture and assembly and that are adapted for use and efficient service throughout substantially the full life of the physical elements of the fluid system with which associated.

While I have described what I regard to be preferred embodiments of my invention, it will be apparent that various changes, rearrangements and modifications may be made therein without departing from the scope of the invention, as defined by the appended claims.

I claim:

1. A temperature and pressure responsive valve comprising a first hollow body member having an outlet port therein, a second hollow body member having an inlet port therein, said body members being secured together with their interiors in communication with one another, a valve seat stamping sealingly confined between said body members including a tubular portion extending into said first body member and terminating in a valve seat, a valve member including a valve stem mounted in said first body member for reciprocal movement coaxial with said valve seat, said valve member comprising a cup-shaped stamping of a size larger than said tubular portion carried by said stem and normally fitting over said tubular portion of said valve seat stamping, said valve member including a wall encircling said tubular portion of said valve seat stamping in radially spaced relation thereto to define a huddling chamber upon movement of said cup-shaped stamping away from said valve seat, a strap confined between said body members extending into said first body member and guiding said valve stem for reciprocal movement of said cup-shaped stamping toward and away from said valve seat, a compression spring confined between said first body member and said valve member normally biasing said cup-shaped stamping into engagement with said valve seat, an adjusting member adjustably mounted on said first body member and having operative engagement with said spring to vary the biasing force of said spring on said valve member, said cup-shaped stamping being responsive to the pressure of fluid entering said second body member through said inlet port to be moved away from said valve seat when the force of fluid pressure acting on the portion of said cup-shaped stamping exposed through said tubular portion of said valve seat stamping exceeds the adjusted biasing force of said spring to relieve the system with which the valve is associated of excessive pressure conditions, a second strap confined between said body members and extending into said second body member, a pressure insensitive-temperature responsive unit supported by said second strap coaxial with said valve member to be directly exposed to fluid in the path of normal fluid flow through the system with which the valve is associated, said unit including a rigid cylinder element, a relatively movable piston element and a temperature responsive actuating means confined between said elements, one of said elements being supported by said second strap, the other of said elements extending axially toward and being operatively engageable with said valve member, said other element upon excessive variation from normal of the temperature of the fluid in the system being moved into operative engagement with said valve member to move said cup-shaped stamping off said valve seat to vent the system with which the valve is associated, an adjusting member of effectively variable length adjustably mounted between said valve member and said other element to vary the temperature at which said other element opens the valve, and a second spring in said second body member operatively confined between said other element and a stationary member of the valve normally biasing said other element away from said valve member, said other element being operatively engageable with but mechanically independent of said valve member, whereby the valve is opened upon occurrence of a predetermined fluid pressure irrespective of the temperature of the fluid and is opened upon occurrence of a predetermined fluid temperature irrespective of the fluid pressure.

2. A valve as set forth in claim 1, said inlet port being axially aligned with said valve seat and said valve member, said second body member including a continuously open radial outlet port defining an L-shaped path of normal fluid flow through the body, said pressure insensitive-temperature responsive unit being mounted within said second body member on said second strap directly in said L-shaped path of normal fluid flow.

3. A temperature and pressure responsive valve comprising a first hollow body member closed at one end and having a radial outlet port therein, a second hollow body member having an axial inlet port therein, said body members being secured together with their interiors in communication with one another, a valve seat stamping sealingly confined between said body members including a tubular portion coaxial with said inlet extending into said first body member and terminating in a circular valve seat, a valve member reciprocably mounted in said first body member coaxial with said valve seat and including a valve stem extending slidably through said one end of said first body member, the valve member comprising a cup-shaped stamping of a size larger than said tubular portion carried adjacent one end of said stem and normally fitting over said tubular portion of said valve seat stamping, said valve member including a resilient seal within said cup-shaped stamping sealingly engageable with said valve seat and a cylindrical wall encircling said tubular portion of said valve seat stamping in radially spaced relation thereto to define a huddling chamber upon movement of said cup-shaped stamping away from said valve seat, a strap confined between said body members extending into said first body member and guiding said valve stem for reciprocable movement of said cup-shaped stamping toward and away from said valve seat, a compression spring encircling said valve stem and confined between said first body member and said valve member normally biasing said cup-shaped stamping into engagement with said valve seat, a tubular adjusting screw coaxial with and slidably receiving said valve stem and threaded into said end of said first body member, said screw having operative engagement with said spring to vary the biasing force of said spring on said valve member, a lever disposed to the exterior of said body members and connected to the portion of said valve stem projecting through said end of said first body member to accommodate manual actuation of said valve member, a lost motion connection between said lever and said cup-shaped stamping, said cup-shaped stamping being responsive to the pressure of fluid entering said second body member through said inlet port to be moved away from said valve seat independently of said lever when the force of fluid pressure acting on the portion of said cup-shaped stamping exposed to said inlet port through said tubular portion exceeds the adjusted biasing force of said spring to relieve the system with which the valve is associated of excessive pressure conditions, a second strap confined between said body members and extending into said second body member, a pressure insensitive-temperature responsive unit supported by said second strap coaxial with said valve member and said inlet to be directly exposed to fluid in the path of normal fluid flow through the system with which the valve is associated, said unit including a rigid cylinder element carried by said second strap, a relatively movable piston element and a temperature responsive actuating means confined between said elements, said piston element extending axially toward and being operatively engageable with said valve member, said piston element upon increase in the temperature of the fluid in the system above a predetermined maximum being moved into operative engagement with said valve member to move said cup-shaped stamping off said valve seat to vent the system with which the valve is associated of fluid at excessive temperature, a threaded adjustment between said valve member and said piston element to vary the temperature at which said piston element opens the valve, and a second compression spring operatively confined between said piston element and said valve seat stamping normally biasing said piston element away from said valve member, said piston element being operatively engageable with but mechanically independent of said valve member, whereby the valve is opened upon occurrence of excessive fluid pressure irrespective of the temperature of the fluid and is opened upon occurrence of excessive fluid temperature irrespective of fluid pressure.

4. A temperature and pressure responsive valve comprising a body having an axial inlet port and a radial outlet port therein, means in said body between said inlet port and said outlet port including a tubular portion coaxial with said inlet extending toward said outlet and terminating in a valve seat, a valve member reciprocably mounted in said body coaxial with and to the outlet port side of said valve seat, said valve member including an axial valve stem extending toward and beyond said outlet port and slidably through said body to the exterior thereof, said valve member being of a size larger than said tubular portion and including a resilient seal sealingly engageable with said valve seat, a tubular adjusting screw coaxial with and slidably receiving said valve stem and threaded into said body, said screw being adjustable from the exterior of said body, a plate engaging the inner end of said screw, a compression spring in said body to the outlet port side of said valve seat encircling said valve stem and confined between said plate and said valve member normally biasing said valve member into engagement with said valve seat, said screw being threadably adjustable in said body to vary the biasing force of said spring on said valve member, a lever disposed to and engageable with the exterior of said body and connected to the portion of said valve stem projecting to the exterior of said body to accommodate manual actuation of said valve member, said valve member being responsive to the pressure of fluid entering said body through said inlet port to be moved away from said valve seat when the force of fluid pressure acting on the portion of said valve member exposed to said inlet port through said tubular portion exceeds the adjusted biasing force of said spring to relieve the system with which the valve is associated of excessive pressure conditions, a support mounted on said body to the inlet port side of said valve seat, a pressure insensitive-temperature responsive unit supported by said support coaxial with said valve member and said inlet to be directly exposed to fluid in the system with which the valve is associated, said unit including a rigid cylinder element, a relatively movable piston element and a temperature responsive actuating means confined between said elements, one of said elements being supported by said support, the other of said elements extending axially toward and being operatively engageable with said valve member, said other element upon increase in the temperature of the fluid in the system above a predetermined maximum being moved into operative engagement with said valve member to move said valve member off said valve seat to vent the system with which the valve is associated of fluid at excesive temperature, and a second compression spring in said body to the inlet port side of said valve seat operatively confined between said other element and said means defining said valve seat normally biasing said other element away from said valve member, said other element being operatively engageable with but mechanically independent of said valve member, whereby the valve is opened automatically upon occurrence of excessive fluid pressure irrespective of the temperature of the fluid, is opened automatically upon occurrence of excessive fluid temperature irrespective of fluid pressure and may be open manually by said lever irrespective of fluid conditions.

5. A temperature and pressure responsive valve comprising a first hollow body member closed at one end and having a radial outlet port therein, a second hollow body member having an inlet port therein, said body members being secured together with their interiors in communication with one another, a valve seat stamping sealingly confined between said body members including a tubular portion extending into said first body member and terminating in a valve seat, a valve member reciprocably mounted in said first body member coaxial with said valve seat and including a valve stem extending slidably through said one end of said first body member, the valve member comprising a cup-shaped stamping of a size larger than said tubular portion carried by said stem and normally fitting over said tubular portion of said valve seat stamping to define therewith a huddling chamber upon movement of said cup-shaped stamping away from said valve seat, a compression spring confined between said first body member and said valve member normally biasing said cup-shaped stamping into engagement with said valve seat, a lever disposed to the exterior of said end of said first body member and connected to the portion of said valve stem projecting through said end of said first body member to accommodate manual actuation of said valve member, a lost motion connection between said lever and said cup-shaped stamping, said cup-shaped stamping being responsive to the pressure of fluid entering said second body member through said inlet port to be moved away from said valve seat independently of said lever when the force of fluid pressure acting on the portion of said cup-shaped stamping exposed through said tubular portion exceeds the adjusted biasing force of said spring to relieve the system with which the valve is associated of excessive pressure conditions, a strap confined between said body members and extending into said second body member, a pressure insensitive-temperature responsive unit supported by said strap coaxial with said valve member to be directly exposed to fluid in the path of normal fluid flow through the system with which the valve is associated, said unit including a rigid cylinder element, a relatively movable piston element and a temperature responsive actuating means confined between said elements, one of said elements being supported by said strap, the other of said elements extending axially toward and being operatively engageable with said valve member, said other element upon increase in the temperature of the fluid in the system being moved into operative engagement with said valve member to move said cup-shaped stamping off said valve seat to vent the system with which the valve is associated of fluid at excessive temperature, said other element being operatively engageable with and mechanically independent of said valve member, whereby the valve is opened upon occurence of excessive fluid pressure irrespective of the temperature of the fluid and is opened upon occurrence of excessive fluid temperature irrespective of fluid pressure, the valve being opened automatically upon occurrence of either of said excessive fluid conditions independently of said lever and being adapted to be opened manually by said lever irrespective of fluid conditions.

6. A valve comprising a first hollow body member having an outlet port therein, a second hollow body member having an axial inlet port therein, said body members being secured together with their interiors in communication with one another, a valve seat stamping sealingly confined between said body members including a tubular portion coaxial with said inlet extending into one of said body members and terminating in a valve seat, a valve member reciprocably mounted in said one body member coaxial with said valve seat, said valve member comprising a cup-shaped stamping of a size larger than said tubular portion normally fitting over said tubular portion of said valve seat stamping, said valve member including a resilient seal within said cup-shaped stamping sealingly engageable with said valve seat and a wall encircling said tubular portion in radially spaced relation thereto to define therewith a huddling chamber, a compression spring in said one body member effectively confined between said one body member and said valve member normally biasing said cup-shaped stamping into engagement with said valve seat, a strap confined between said body members and extending into said second body member, a pressure insensitive-temperature responsive unit supported by said strap coaxial with said valve member and said inlet, said unit including a rigid cylinder element, a relatively movable piston element, and a temperature responsive actuating means between said elements, said elements and said means being located outside of and remotely of said body members in axial alignment with said inlet to be directly exposed to fluid in the path of normal fluid flow through the system with which the valve is associated, an elongate tube element extending from the interior of said second body member axially through said inlet port and away from the body, and a rod element slidably mounted in said tube element, one of said rod and tube elements being supported at its inner end in said second body member by said strap and the other of said rod and tube elements being operatively associated at its inner end with said valve member, one of said piston and cylinder elements of said pressure insensitive-temperature responsive units being mounted at the outer end of said tube element and the other of said piston and cylinder elements being operatively associated with the outer end of said rod element, said piston and cylinder elements upon increase of the temperature of the fluid in the system above a predetermined maximum being moved relative to one another to impart relative movement to said rod and tube elements, said other of said rod and tube elements thereupon being moved into operative engagement with said valve member to move said cup-shaped stamping off said valve seat, said spring upon decrease in fluid temperature returning said cup-shaped stamping to said valve seat.

References Cited in the file of this patent

UNITED STATES PATENTS

| | | |
|---|---|---|
| 1,927,036 | Johnson | Sept. 19, 1923 |
| 2,031,558 | Clifford | Feb. 18, 1936 |
| 2,112,665 | Dube | Mar. 29, 1938 |
| 2,268,359 | Tustin | Dec. 30, 1941 |
| 2,351,190 | Carlson | June 13, 1944 |
| 2,469,930 | Payne | May 10, 1949 |
| 2,506,737 | Pacquin | May 9, 1950 |
| 2,548,878 | Dillman | Apr. 17, 1951 |
| 2,570,432 | Dillon | Oct. 9, 1951 |
| 2,598,351 | Carter | May 27, 1952 |